United States Patent [19]

Robbins

[11] Patent Number: 5,117,195
[45] Date of Patent: May 26, 1992

[54] DATA REFERENCED DEMODULATION OF MULTIPHASE MODULATED DATA

[75] Inventor: Clyde Robbins, Maple Glen, Pa.

[73] Assignee: General Instrument Corporation, Hatboro, Pa.

[21] Appl. No.: 701,772

[22] Filed: May 17, 1991

[51] Int. Cl.⁵ .............................................. H04L 27/22
[52] U.S. Cl. .................................. 329/307; 329/309; 329/310; 375/81; 375/83
[58] Field of Search ............... 329/304–310; 375/80–87

[56] References Cited

U.S. PATENT DOCUMENTS

| | | | |
|---|---|---|---|
| 3,938,052 | 2/1976 | Glasson et al. | 375/82 X |
| 3,980,824 | 9/1976 | Lamb et al. | 375/81 X |
| 4,714,892 | 12/1987 | Ishizuka | 375/84 X |
| 4,821,097 | 4/1989 | Robbins | 358/143 |

OTHER PUBLICATIONS

C. Robbins, "Digital Audio for Cable Television," 1986 *NCTA Technical Papers*, Dallas, Texas, Mar. 15–18, 1986, pp. 21–24.

*Primary Examiner*—Siegfried H. Grimm
*Attorney, Agent, or Firm*—Barry R. Lipsitz

[57] ABSTRACT

A data referenced demodulator is provided for recovering differentially encoded multiphase modulated digital data such as QPSK modulated audio data. An analog carrier containing the differentially encoded QPSK data is converted to a digital waveform at an intermediate frequency that is a multiple of the QPSK bit frequency. The digital waveform is delayed in a shift register that samples the waveform at a clock rate which is a multiple of the intermediate frequency. Different stages of the shift register output the digital waveform one bit time earlier plus 45° and one bit time earlier minus 45°. These outputs of the shift register are multipled with the digital waveform using exclusive OR gates to provide differential QPSK detection. The shift register sampling clock is phase locked to a system master clock, which in turn is locked to the received data. In an illustrated embodiment, the sampling clock is 24 times the intermediate frequency, providing 15° phase resolution.

20 Claims, 2 Drawing Sheets

DATA REFERENCED DEMODULATION OF MULTIPHASE MODULATED DATA

BACKGROUND OF THE INVENTION

The present invention relates to the recovery of multiphase modulated digital data, and more particularly to a method and apparatus for recovering high quality digital audio signals transmitted via a cable television system or over the airwaves.

New digital techniques for the reproduction of sound provide performance that is far superior to analog techniques which have been used in the past. An example of high fidelity sound reproduction using digital techniques can be found in the compact disc technology that has enjoyed tremendous success as an alternative to phonograph records and tapes. Digital recording and playback techniques provide reproduction of music that is extremely realistic and absent from background noise and distortions which have plagued other high fidelity sound reproduction systems in wide scale use.

Cable television ("CATV") networks can provide one medium for the transmission of digital audio programs. Cable television growth has come from the development of various programming categories and by the technologies which have made program delivery possible. Cable first brought distant television signals to areas where there was little or no off-air reception. This applies to distant signals and weak signal areas where outdoor antennas were previously mandatory. The next category to bring major growth to cable was pay service after the development of reasonable cost satellite delivery systems. After satellite delivery became less costly and was accepted in the industry, super stations and cable networks formed another category of programming that has become customary, providing "extended basic" services. Franchising and local politics have created a generally unprofitable but necessary category called "local origination". Recently, addressable technology and aggressive marketing have enabled "pay-per-view" programming to proliferate.

The provision of high quality audio services over cable is rapidly becoming available. In the past, the signal quality of analog audio transmission techniques has been poor and there has been no efficient way to collect revenue or control access to such services.

Digital techniques for the communication of high fidelity audio programs via a CATV network as well as via direct broadcast satellite and over the air enable the provision of high quality audio services on a subscription basis. Commonly owned U.S. Pat. application Ser. No. 07/280,770 filed Dec. 6, 1988, and now U.S. Pat. No. 5,038,402, for "Apparatus and Method for Providing Digital Audio in the FM Broadcast Band", incorporated herein by reference, discloses a method and apparatus for providing high quality digital sound signals within the FM broadcast band. Commonly owned U.S. Pat. No. 4,821,097 to C. Robbins entitled "Apparatus and Method for Providing Digital Audio on the Sound Carrier of a Standard Television Signal", also incorporated herein by reference, discloses a system wherein the FM audio portion of a standard television signal is replaced with digital audio. In the techniques disclosed in these references, the digital audio information is carried using multilevel (e.g., multiphase) modulation.

A well known type of multiphase modulation is quadrature phase shift keyed ("QPSK") modulation. Advantages of QPSK modulation are discussed in C. Robbins, "Digital Audio for Cable Television", 1986 *NCTA Technical Papers*, Dallas, Texas, Mar. 15–18, 1986, pp. 21–24.

In a QPSK transmission, an in-phase component I and an out-of-phase component Q (typically, 90° out of phase with the I component) are provided. The I and Q components are processed in a well known manner to recover the original digital data that was used to modulate the QPSK signal. One known technique for detecting the I and Q components from the transmitted signal on which they are carried uses an independent phase reference derived independently of the modulated data carrier. An example of such a demodulator is provided in FIG. 6 of the above-mentioned U.S. Pat. No. 4,821,097. Various analog and analog/digital schemes that do not require an independent phase reference are also known.

It would be advantageous to provide demodulation of multiphase modulated data using purely digital techniques. This would allow the demodulator to be constructed from a very large scale integrated circuit ("VLSI") at a cost advantage over prior art systems. It would be further advantageous to provide such a digital demodulator that does not require an independent phase reference to be carried in the transmitted signal, and which can be implemented using a digital delay without the need for a complicated digital to analog converter. It would also be advantageous for such a demodulator to include an automatic frequency control ("AFC") to enable accurate recovery of the modulated phase components using the data carrier itself as a reference.

The present invention provides a method and apparatus enjoying the above-mentioned advantages.

SUMMARY OF THE INVENTION

In accordance with the present invention, a method is provided for recovering differentially encoded multiphase modulated digital data. An analog carrier containing the multiphase modulated data is received. The received carrier is converted to an intermediate frequency ("IF") that is a multiple of a bit frequency at which the multiphase data is modulated. The converted carrier is delayed to provide a prior portion thereof for processing with a current portion thereof to recover phase components of the modulated data. In order to provide an AFC function, the phase of a first cycle of the converted carrier can be compared to the phase of a second cycle of the converted carrier to generate an error signal. The error signal is then used to maintain the intermediate frequency at said multiple. Preferably, the first and second cycles of the converted carrier that are compared to provide the AFC function are adjacent cycles.

In a preferred embodiment, the intermediate frequency is an integral multiple of the bit frequency, although such a relationship is not required. In order to properly recover the data, the intermediate frequency should be at least two times the bit frequency.

A multiphase digital demodulator incorporating the present invention is also disclosed. Means are provided for receiving an analog carrier containing differentially encoded multiphase modulated data. Means coupled to the receiving means convert the received carrier to an intermediate frequency that is a multiple of a bit frequency at which the multiphase data is modulated. Means, coupled to receive the converted carrier, delay the converted carrier to provide a prior portion thereof.

Means are provided for processing the prior portion with a current portion of the converted carrier to recover phase components of the modulated data.

An AFC function is provided by means that compare the phase of a first cycle of the converted carrier to the phase of a second cycle of the converted carrier to generate an error signal. Means operatively associated with the converting means and responsive to the error signal maintain the intermediate frequency at said multiple. The intermediate frequency is preferably an integral multiple of the bit frequency, and at least two times the bit frequency. In an illustrated embodiment, the delay means comprise a shift register clocked at a rate that is a multiple of the bit frequency and the intermediate frequency.

In a more specific embodiment, a demodulator for multiphase modulated digital data carried on an analog carrier is provided. A received analog carrier is converted to an intermediate frequency that is a first multiple of a bit rate at which differentially encoded multiphase modulated data is carried on the carrier. Means, responsive to a clock signal that is a second multiple of the bit rate, delay the converted carrier by a time necessary to provide first portions thereof containing a prior data bit. Means process the first portions together with a second portion of the converted carrier containing a current data bit, to recover phase components of the multiphase modulated data. Means are coupled to the processing means for recovering clock information and said data from the phase components. Means responsive to the recovered clock information maintain the frequency of the clock signal at said second multiple.

The delay means include means for providing a cycle of the converted carrier that is adjacent to a cycle containing the prior data bit. The apparatus further comprises means for generating an error signal indicative of the phase relationship between the adjacent cycles and means responsive to the error signal for maintaining the intermediate frequency at said first multiple. The delay means can comprise a multi-stage shift register, wherein said first portions of the converted carrier and the adjacent cycles thereof are output from respective stages of the shift register. In an illustrated embodiment, the data is differentially encoded QPSK modulated data. In order to recover the QPSK I and Q phase components, the first portions of the converted carrier include information that leads the prior bit by 45° and information that lags the prior bit by 45°. The leading and lagging information is input to the processing means. In a specific embodiment, the QPSK modulated data is audio data.

DETAILED DESCRIPTION OF THE INVENTION

In a demodulator for recovering multiphase modulated digital data in accordance with the present invention, the data carrier is converted to a frequency that is a multiple of the bit frequency at which the multiphase data is modulated. A phase comparator is used to compare the phase relationship between two adjacent carrier cycles, and generate an error signal for maintaining a fixed relationship between the converted carrier frequency and the data bit rate.

Figure 1:
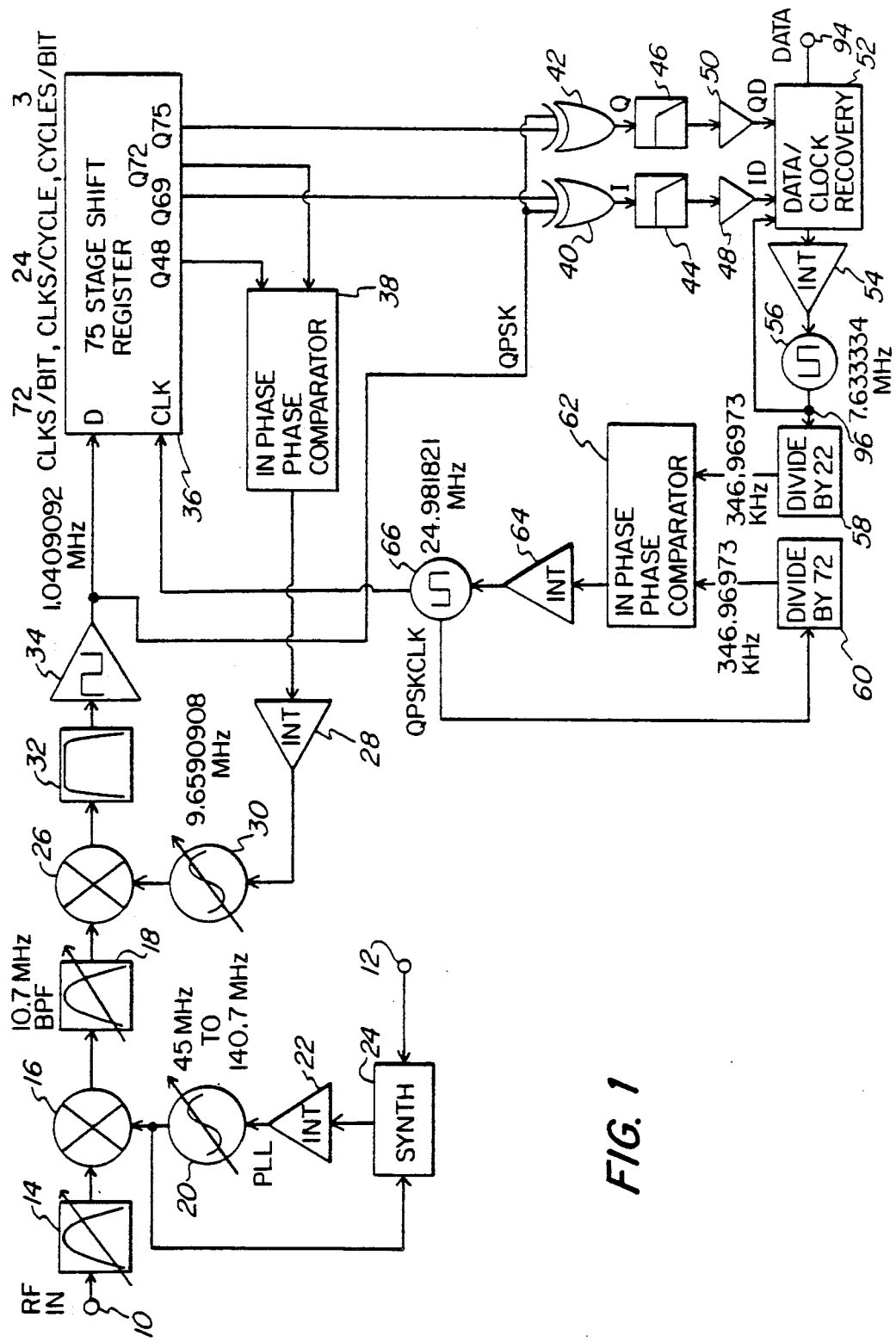
FIG. 1 is a block diagram of a digital demodulator in accordance with the present invention.

As illustrated in FIG. 1, in which the heavy lines represent components that are advantageously implemented in a digital integrated circuit, a radio frequency ("RF") signal that carries the multiphase modulated data is input at a terminal 10. Such a signal can comprise, for example, a digital audio signal transmitted via a cable television network. Those skilled in the art will appreciate that such signals can also be transmitted using other distribution channels, such as direct broadcast satellite or optical fiber networks. As is well known, transmission via optical fibers occurs at lightwave frequencies. Signals that originate in the RF domain can be used to modulate a light source for optical transmission.

The analog carrier received at input terminal 10 contains differentially encoded multiphase modulated data. In the embodiment illustrated in FIG. 1, the data is differentially encoded quadrature phase shift keyed ("QPSK") data. Differential encoding manipulates digits in the data stream so that only changes in the phase of the QPSK signal, as opposed to the absolute phase, represent the transmitted information. Thus, a reference phase is not needed. As a result, the recovered phase information may not match the transmitted phase information. After differential decoding in the receiver, however, the recovered data will be identical to the data transmitted.

In the specific embodiment illustrated in FIG. 1, the QPSK data is modulated at a bit frequency of 346.96973 KHz. In accordance with the present invention, the second IF frequency of 1.0409092 MHz is three times the QPSK bit frequency. By providing the second IF as a multiple of the QPSK bit frequency, a single master clock 56 can be used to recover the I and Q QPSK phase components from the digital waveform and to recover the QPSK data from the I and Q components.

The signal received at terminal 10 is coupled to a conventional FM tuner comprising bandpass filters 14 and 18, mixer 16, and local oscillator 20 for selecting a desired signal, e.g., within the FM radio or cable television band. Channel selection is obtained via a tuning signal input to a conventional frequency synthesizer 24 via terminal 12. The output of frequency synthesizer 24 is integrated at integrator 22 and used to tune variable local oscillator 20 in a conventional manner. The selected channel is output from bandpass filter 18 at a first intermediate frequency of 10.7 MHz.

The tuner can be provided with an expanded tuning range (e.g., from about 45 MHz to 140.7 MHz) without local oscillator and bandpass tracking problems by providing bandpass filter 18 with a Q of only about 10. The primary purpose of the bandpass is to provide image rejection. A secondary purpose is to reduce the total signal power at mixer 16. In order to accommodate reception of audio signals on a video carrier at a level of about 15 dB above the data carrier, a minimum of 35 dB image rejection is required. Two double-tuned tracking stages can be used in order to provide adequate rejection. In order to maximize the slope of the filters on the image side, inductive coupling can be used in the tuner.

A second mixer 26 is used to convert the 10.7 MHz output of bandpass filter 18 down to 1.0409092 MHz with the use of local oscillator 30 that outputs a mixing frequency of 9.6590908 MHz. This second IF conversion is done to reduce the frequency of the signal carrier to a frequency that is low enough for digital demodulation in accordance with the present invention.

A 1.04 MHz bandpass filter 32 is used to remove the 10.7 MHz IF and local oscillator components and adjacent channels prior to inputting the 1.0409092 MHz signal to a conventional limiter 34. Filter 32 is wide enough to prevent group delay distortion of a differentially encoded quadrature phase shift keyed ("QPSK") signal contained in the received carrier. The tuner is designed in accordance with conventional techniques to have a gain that causes limiting to occur in limiter 34 with a signal of about −4.5 dBmV. Limiter 34 converts the converted carrier from filter 32 to a two-level digital waveform for subsequent processing to recover the QPSK modulated data.

The digital waveform output from limiter 34 is coupled to the D input of a shift register 36 that is clocked at a multiple of the intermediate frequency. In the embodiment illustrated, shift register 36 contains 75 stages. It is clocked by a 24.981821 MHz clock signal from clock 66. This clock rate is 24 times the intermediate frequency of 1.0409092, and 72 times the QPSK bit frequency of 346.96973 KHz. Therefore, shift register 36 will process 72 clocks per bit, 24 clocks per cycle of the digital waveform, and 3 cycles of the digital waveform per bit of QPSK data.

In view of the above relationships, the data is clocked into the shift register in fixed increments of 15° of the data carrier (360° per cycle/24 clocks per cycle = 15°). The data at the 72nd stage of shift register 36 (Q 72) is exactly one bit behind the current digital waveform data output from limiter 34. Since each stage of shift register 36 is the equivalent of 15°. of a data carrier cycle, the QPSK I and Q phase components can be easily recovered by multiplying the digital waveform output from limiter 34 by information from the shift register that leads the prior bit by 45° and information that lags the prior bit by 45°. In particular, stage 69 (Q 69) of shift register 36 lags the prior bit output from stage 72 by three clock cycles which is the equivalent of −45°. Similarly, the information output from the 75th stage (Q 75) of shift register 36 leads the prior bit from stage 72 by +45°.

Exclusive OR gate 40 multiplies the digital waveform from limiter 34 by the −45° output of shift register stage Q 69 to recover the I phase component of the QPSK data. Exclusive OR gate 42 multiplies the digital waveform from limiter 34 by the +45° output from Q 75 of the shift register. 175 KHz low pass filters 44, 46 are provided at the outputs of exclusive OR gates 40, 42 respectively to eliminate carrier and harmonic components. The phase components are then buffered at buffers 48, 50 and input to a data/clock recovery circuit 52. Circuit 52 samples the I and Q phase components and serializes the data for output at data output terminal 94, as described in greater detail below in connection with FIG. 2.

In order to maintain the proper frequency relationships between the shift register clock and the intermediate frequency of the digital waveform, various feedback loops are provided. In particular, the intermediate frequency is maintained at the proper multiple of the QPSK bit frequency using an "in-phase" phase comparator 38 and integrator 28 that control oscillator 30. Comparator 38 compares the phase of a first cycle of the digital waveform to the phase of a second cycle of the digital waveform to generate an error signal. In the illustrated embodiment, the first and second cycles of the digital waveform processed by phase comparator 38 are adjacent cycles recovered from stages Q 48 and Q 72 of shift register 36. As noted above, stage Q 72 of the shift register is exactly one bit behind the digital waveform. Stage Q 48 is exactly one cycle (24 clocks) prior to the output of stage Q 72. Any difference in the phase between the adjacent cycles produces a corresponding error signal that is integrated at integrator 28 for use in controlling the output frequency of local oscillator 30 in a conventional manner.

Frequency control of the shift register clock 66 is provided by feeding the clock output frequency back to a divide by seventy-two circuit 60 that recovers the original 346.96973 KHz QPSK bit frequency. This is compared in an "in-phase" phase comparator 62 to the QPSK bit frequency derived by dividing the frequency of master clock 56 (7.633334 MHz) by twenty-two in circuit 58. Any difference in the bit frequency derived from the master clock and the bit frequency derived from the shift register clock is converted by phase comparator 62 to an error signal, integrated in an integrator 64, and used to adjust the output of shift register clock 66 in a conventional manner.

Figure 2:
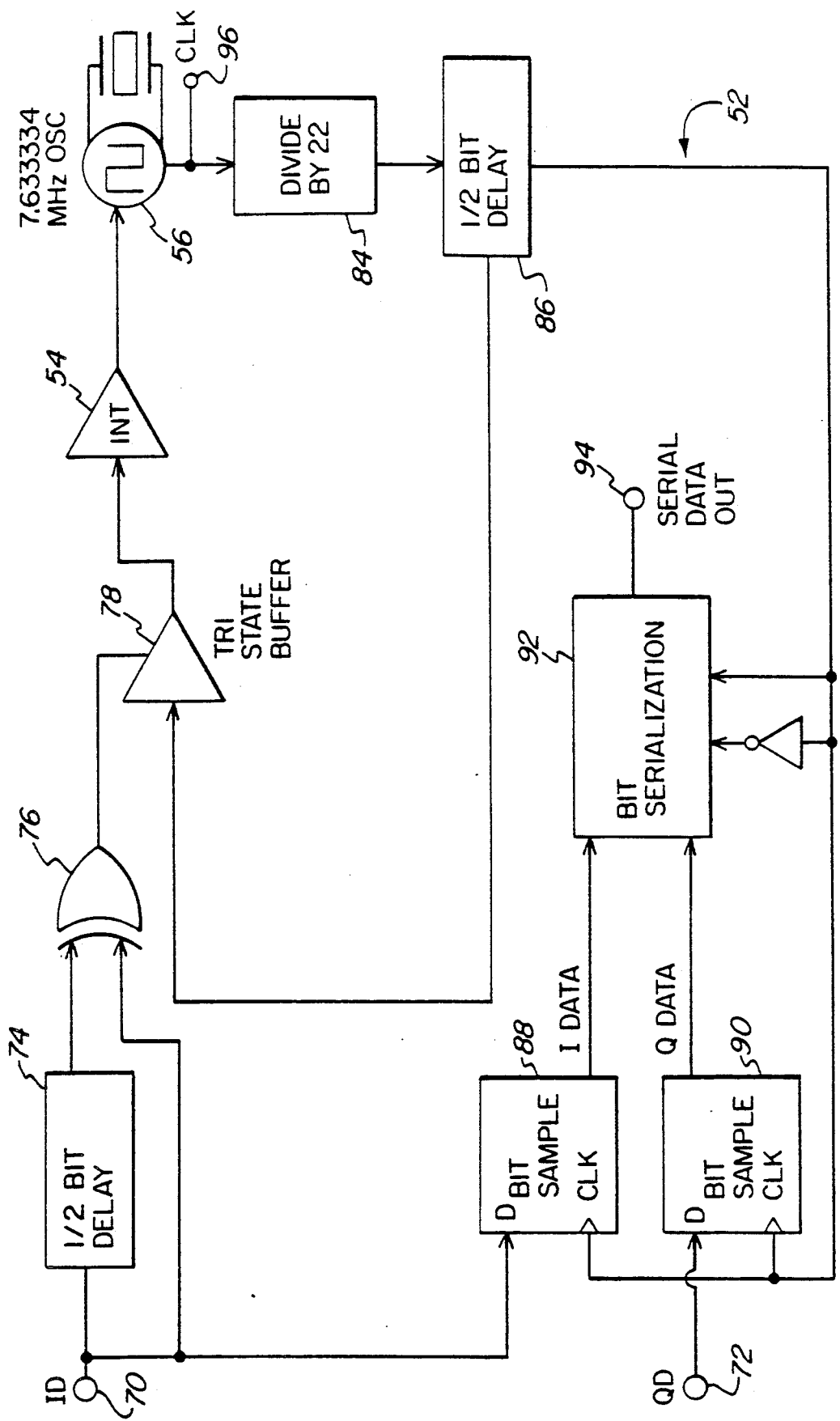
FIG. 2 is a block diagram of a data/clock recovery circuit that can be used in the demodulator of FIG. 1.

FIG. 2 is a block diagram of one embodiment of a data/clock recovery circuit 52 that can be used in the embodiment of FIG. 1. The I phase component ("ID") recovered by the demodulator is input to a terminal 70. The Q phase component ("QD") is input to a terminal 72. The I component is input directly to an exclusive OR gate 76 and also input to the exclusive OR gate via a one-half bit delay 74. Exclusive OR gate 76 will generate a signal pulse upon the transition of the I component. The signal pulse is used to enable a tri-state buffer 78 to pass a clock signal at the original QPSK bit frequency derived by dividing the master clock 56 frequency by twenty-two at divider 84 and delaying it by one-half bit at delay 86. In this manner, the proper data clock is provided for sampling the I and Q components at D-type flip-flops 88, 90 respectively. The resultant I and Q data is serialized at a conventional bit serialization circuit 92 and output for use on data output terminal 94. The master clock frequency is output on a terminal 96 for use in the circuit of FIG. 1 as explained above.

It should now be appreciated that the present invention provides a data detector for differentially encoded multiphase modulated data. A multiphase modulated signal, such as a QPSK audio data signal carried via a cable television network or the like is converted to an intermediate frequency that is a multiple of the bit frequency at which the multiphase data is modulated. The converted signal is limited to provide a digital waveform that is clocked along a one-bit digital delay, such as a shift register. Those skilled in the art will appreciate that the shift register can be replaced with another digital delay device, such as a first-in-first-out ("FIFO") register or a random access memory ("RAM") device.

In the illustrated embodiment, the IF frequency is chosen such that three carrier cycles equal exactly one bit. The frequency is maintained by phase comparing the last carrier cycle of the digital delay and holding the edges in phase. The input signal is multiplied with the one-bit delayed signal at +45° and −45° of the carrier, using exclusive OR gates. This scheme provides differential QPSK detection for QPSK data that is differentially encoded at the transmitter.

The sampling clock for the digital delay is phase locked to the system master clock which, in turn, is locked to the received data. In the embodiment illustrated, the sampling clock is 24 times the intermediate frequency, providing 15° of phase resolution.

Although the invention has been described in connection with a specific embodiment thereof, those skilled in the art will appreciate that numerous adaptations and modifications may be made thereto without departing from the spirit and scope of the invention, as set forth in the claims.

What is claimed is:

1. A method for recovering differentially encoded multiphase modulated digital data comprising the steps of:
    receiving an analog carrier containing differentially encoded multiphase modulated data;
    converting the received carrier to a digital waveform at an intermediate frequency that is a multiple of a bit frequency at which the multiphase data is modulated;
    sampling said digital waveform at a clock rate that is a multiple of said intermediate frequency to obtain a prior portion of the waveform; and processing said prior portion of the waveform with a current portion thereof to recover phase components of said modulated data.

2. A method in accordance with claim 1 comprising the further steps of:
    comparing the phase of a first cycle of said digital waveform to the phase of a second cycle of said digital waveform to generate an error signal; and
    using said error signal to maintain said intermediate frequency at said multiple of the bit frequency.

3. A method in accordance with claim 2 wherein said first and second cycles of said digital waveform are adjacent.

4. A method in accordance with claim 3 wherein said intermediate frequency is an integral multiple of said bit frequency.

5. A method in accordance with claim 4 wherein said intermediate frequency is at least two times said bit frequency.

6. A method in accordance with claim 1 wherein said intermediate frequency is an integral multiple of said bit frequency.

7. A method in accordance with claim 1 wherein said intermediate frequency is at least two times said bit frequency.

8. A multiphase digital demodulator comprising:
    means for receiving an analog carrier containing differentially encoded multiphase modulated data;
    means coupled to said receiving means for converting the received carrier to a digital waveform at an intermediate frequency that is a multiple of a bit frequency at which the multiphase data is modulated;
    means, coupled to receive the digital waveform, for delaying the digital waveform to provide a prior portion thereof; and
    means for processing said prior portion with a current portion of the digital waveform to recover phase components of said modulated data.

9. Apparatus in accordance with claim 8 further comprising:
    means for comparing the phase of a first cycle of said digital waveform to the phase of a second cycle of said digital waveform to generate an error signal; and
    means operatively associated with said converting means and responsive to said error signal for maintaining said intermediate frequency at said multiple.

10. Apparatus in accordance with claim 9 wherein said intermediate frequency is an integral multiple of said bit frequency.

11. Apparatus in accordance with claim 10 wherein said intermediate frequency is at least two times said bit frequency.

12. Apparatus in accordance with claim 8 wherein said intermediate frequency is an integral multiple of said bit frequency.

13. Apparatus in accordance with claim 8 wherein said intermediate frequency is at least two times said bit frequency.

14. Apparatus in accordance with claim 8 wherein said delay means comprise a shift register clocked at a rate that is a multiple of said intermediate frequency.

15. A demodulator for multiphase modulated digital data carried on an analog carrier comprising:
    means for converting a received analog carrier to an intermediate frequency that is a first multiple of a bit rate at which multiphase modulated data is carried on the carrier;
    means responsive to a clock signal that is a second multiple of said bit rate for delaying the converted carrier by a time necessary to provide first portions thereof containing a prior data bit; and
    means for processing said first portions together with a second portion of the converted carrier containing a current data bit, to recover phase components of said multiphase modulated data.

16. Apparatus in accordance with claim 15 further comprising:
    means coupled to said processing means for recovering clock information and said data from said phase components; and
    means responsive to said recovered clock information for maintaining the frequency of said clock signal at said second multiple.

17. Apparatus in accordance with claim 16 wherein said delay means comprise means for providing a cycle of said converted carrier that is adjacent to a cycle containing said prior data bit;
    said apparatus further comprising:
    means for generating an error signal indicative of the phase relationship between said adjacent cycles; and
    means responsive to said error signal for maintaining said intermediate frequency at said first multiple.

18. Apparatus in accordance with claim 17 wherein:
    said delay means comprise a multi-stage shift register; and
    said first portions and said adjacent cycles are output from respective stages of said shift register.

19. Apparatus in accordance with claim 18 wherein:
    said data is differentially encoded QPSK modulated data; and
    said first portions include information that leads said prior bit by 45° and information that lags said prior bit by 45° for input to said processing means to recover QPSK I and Q phase components.

20. Apparatus in accordance with claim 19 wherein said intermediate frequency is at least two times said bit rate.

* * * * *